United States Patent
Hansen

(10) Patent No.: US 9,839,287 B2
(45) Date of Patent: Dec. 12, 2017

(54) PORTABLE TABLE TRAILER

(71) Applicant: Adam R. Hansen, Audubon, IA (US)

(72) Inventor: Adam R. Hansen, Audubon, IA (US)

( * ) Notice: Subject to any disclaimer, the term of this patent is extended or adjusted under 35 U.S.C. 154(b) by 0 days.

(21) Appl. No.: 15/252,875

(22) Filed: Aug. 31, 2016

(65) Prior Publication Data

US 2017/0065080 A1    Mar. 9, 2017

Related U.S. Application Data

(60) Provisional application No. 62/215,372, filed on Sep. 8, 2015.

(51) Int. Cl.
| | |
|---|---|
| *A47B 85/06* | (2006.01) |
| *B62D 63/08* | (2006.01) |
| *A47B 83/02* | (2006.01) |
| *B62D 63/06* | (2006.01) |

(52) U.S. Cl.
CPC ............. *A47B 85/06* (2013.01); *A47B 83/02* (2013.01); *B62D 63/06* (2013.01); *B62D 63/08* (2013.01)

(58) Field of Classification Search
CPC .......... A47B 85/06; A47B 83/02; B62D 63/08
See application file for complete search history.

(56) References Cited

U.S. PATENT DOCUMENTS

| D182,822 | S | * | 5/1958 | Kempner | 297/141 |
| 3,395,936 | A | * | 8/1968 | Nicolli | B60N 3/001 108/145 |
| 4,705,084 | A | * | 11/1987 | Rodebaugh | A47C 31/10 108/90 |
| 4,842,316 | A | * | 6/1989 | Lerma | B60P 3/025 296/173 |
| 5,842,425 | A | * | 12/1998 | van der Aa | A47B 87/002 108/103 |
| 6,314,891 | B1 | * | 11/2001 | Larson | A47B 3/14 108/44 |
| 6,354,611 | B1 | * | 3/2002 | Mihalic | A45C 11/20 280/30 |
| 6,416,101 | B1 | * | 7/2002 | Bartch | B60P 3/0257 296/168 |
| 6,637,349 | B1 | * | 10/2003 | Lafferty | A47B 37/04 108/20 |
| 7,226,125 | B2 | * | 6/2007 | Frobose | A47B 3/14 108/64 |
| 8,308,123 | B1 | * | 11/2012 | Accordino | A45B 11/00 248/156 |
| 9,527,355 | B1 | * | 12/2016 | Blevins | B60D 1/54 |
| 2006/0284454 | A1 | * | 12/2006 | VanWyk | A47B 83/02 297/158.3 |

* cited by examiner

*Primary Examiner* — Brian L Swenson
(74) *Attorney, Agent, or Firm* — Zarley Law Firm P.L.C.

(57) ABSTRACT

A portable trailer having a frame connected to a plurality of table supports and a lower support member. The table supports are connected to a table assembly and the lower support members are connected to sea assemblies.

16 Claims, 3 Drawing Sheets

PORTABLE TABLE TRAILER

CROSS REFERENCE TO RELATED APPLICATION

This application claims the benefit of U.S. Provisional Application No. 62/215,372 filed Sep. 8, 2015.

BACKGROUND OF THE INVENTION

This invention is directed to a trailer and more particularly a trailer having a plurality of tables attached thereto.

Tables, such as picnic tables and folding tables, are well-known in the art for use at outdoor dining events and other functions. To assist in moving tables, various solutions have been tried such as attaching wheels to the tables. While helpful, the set-up of tables, particularly for a large event, is time consuming and labor intensive.

Other solutions have been tried such as attaching tables to trailer frames. Again, while helpful, these trailers are difficult to pull behind a vehicle, the seats for the tables are difficult to maneuver, particularly for older people, and the table tops can become very hot to touch. Therefore, a need exists in the art for a device that addresses these deficiencies.

Therefore, an objective of the present invention is to provide a portable table trailer that is easy to transport and set up.

Another objective of this invention is to provide a portable table trailer that is more functional and easier for individuals to sit and maneuver around.

A still further objective of the present invention is to provide a portable table trailer having table tops that are non-expandable and maintains an ambient temperature.

These and other objectives will be apparent to those of ordinary skill in the art based upon the following written description and drawings.

SUMMARY OF THE INVENTION

A portable table trailer having a frame that includes an elongated member that extends from a first end to a second end. A plurality of table supports including a transverse brace and vertical supports are connected to the elongated member. A table assembly, including a rectangular frame, a steel plate, and a table cover are connected to the vertical supports.

Connected to lower ends of the vertical supports and transverse to the elongated member are a plurality of lower support members that extend beyond supporting wheels. Connected to the ends of the lower support members are set assemblies. The seat assemblies include a seat frame, a seat plate, and a seat cover.

DETAILED DESCRIPTION OF THE PREFERRED EMBODIMENT

Figure 1:
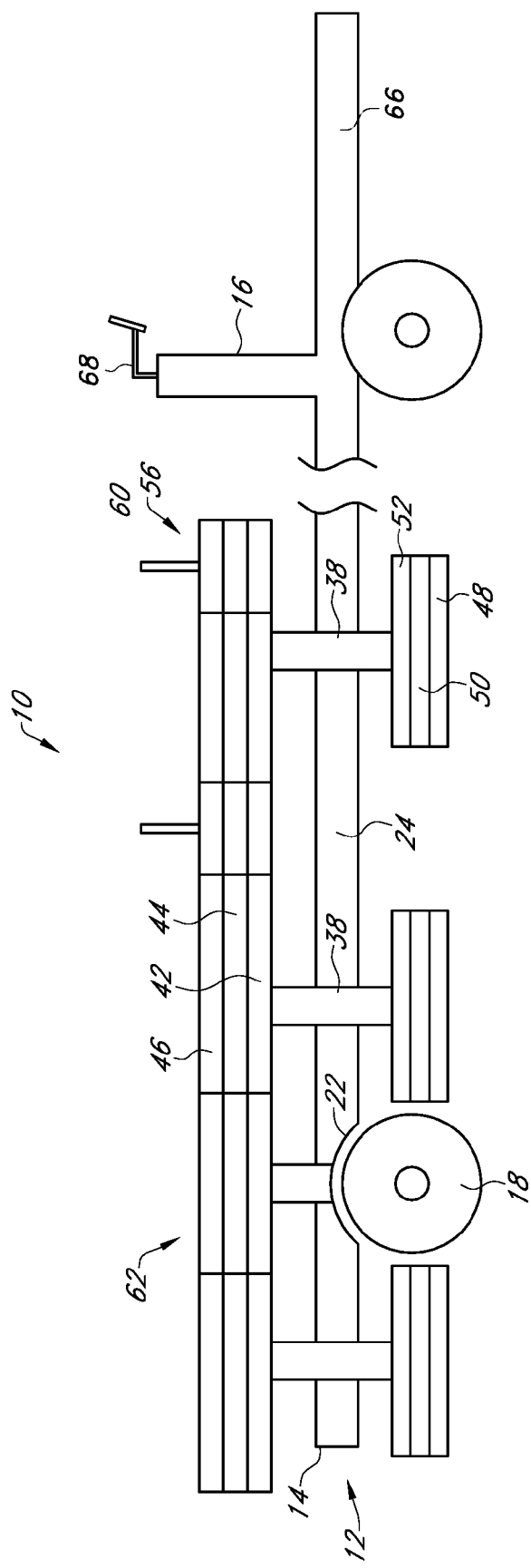
FIG. 1 is a side view of a portable table trailer.
Figure 2:
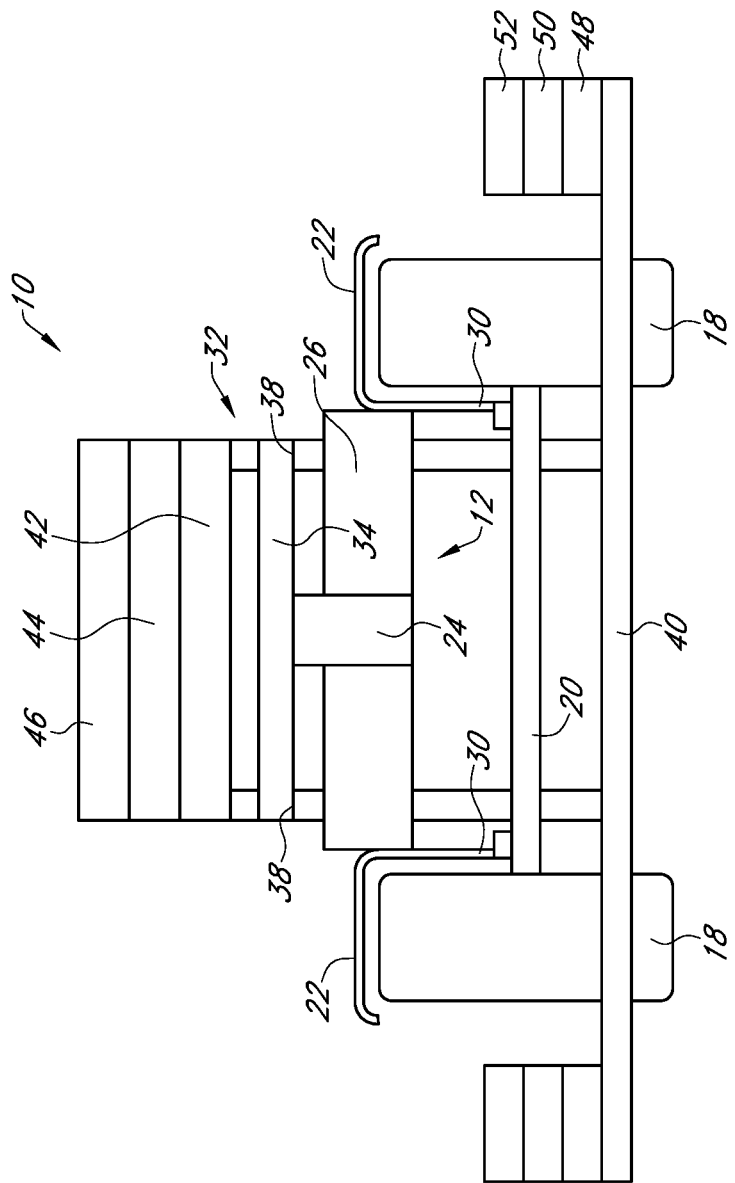
FIG. 2 is an end view of a portable table trailer.
Figure 3:
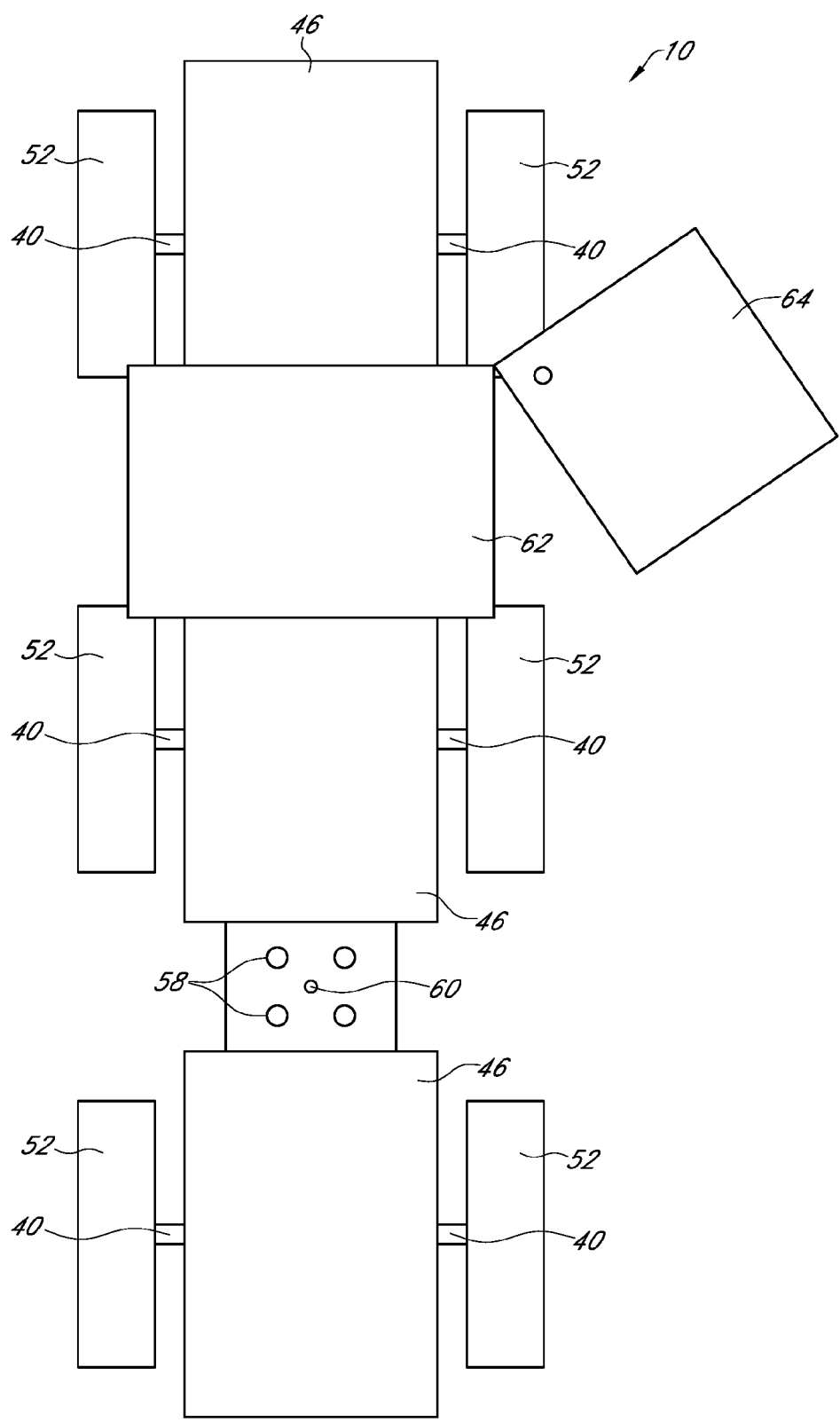
FIG. 3 is top plan view of a portable table trailer.

Referring to the figures, a portable table trailer 10 has a frame 12 having a first or rear end 14 and a second or front end 16. The frame 12 is supported by a pair of wheels 18 that are rotatably connected to an axle 20 near the first end 14. Covering each wheel 18 is a fender 22.

The frame 12 has an elongated support member 24 that extends from the first end 14 toward the second end 16. One or more transverse support members 26 extend outwardly and perpendicularly from the elongated support member 24. The outer end 28 of one transverse support member 26 is connected to the axle 20 and the fender 22 by a bracket 30.

Connected to the elongated support member 24 are a plurality of table supports 32. The table supports 32 include a brace 34 that is transverse to the elongated support member 24 and is welded to the top of the elongated support member 24. Welded to the ends of brace 34 are a pair of vertical supports 38 that extend above the brace 34 and below the elongated support member 24. Welded to the lower end of the vertical supports 38 is a lower support member 40 that is transverse to the elongated support member 24 and extends outwardly, beyond the wheels 18.

Connected to the top of vertical supports 38 is a rectangular frame 42. Attached to the top of the rectangular frame 42 is a steel plate 44 that covers the frame 42. Attached to the steel plate 44 is a table cover 46, preferably made of a PVC plastic that is non-expandable and maintains the ambient temperature.

Connected to the top of the lower support members 40 at the end of the lower support member 43 is a seat frame 48 having a steel plate 50 attached to frame 48 and a seat cover 52 attached to plate 50. Between adjacent seats 52 is a space 54 that permits easier access to the seats 52 and avoids the need to climb over the seats 52.

Connected to frames 42, between table covers 46 are utility sections 56. The utility sections 56 are similar in construction to the tables 46, but also include a plurality of cavities 58 to hold cups and a centralized pole 60 for holding paper towels.

Extending over the fenders 22, and transverse to the tables 46, is a serving section 62 having similar construction to the tables 46. The serving section 62 has a portion or pendulum 64 that pivots outwardly of a fender 22. Preferably, a grill or similar cooking device would be placed on the pivoting portion 64.

Attached to the frame 12 at the front end 16 is a folding hitch assembly 66. The folding hitch assembly is configured to fold-up vertically with a jack 68 and a wheel when not in use.

Thus, a portable table trailer has been disclosed that at the very least meets all the stated objectives.

What is claimed is:

1. A portable trailer, comprising;
a frame supported by a pair of wheels having an elongated member that extends from a first end of the frame to a second end of the frame;
a transverse support member extending outwardly and perpendicularly from the elongated member, wherein an outer end of the transverse support member is connected to an axle and a fender;
a brace connected to the top of and extending transversely to the elongated support member;
a pair of vertical supports connected to the ends of the brace extending above and below the elongated support member;
a plurality of table supports connected to the elongated member; and
a plurality of table assemblies connected to the table supports.

2. The trailer of claim 1 wherein the plurality of table supports include a brace connected transversely to a top of the elongated support member and a pair of vertical support members connected to ends of the brace.

3. The trailer of claim 2 wherein a rectangular frame is connected to tops of the vertical supports, a steel plate is connected to and covers the rectangular frame, and a table cover is connected to the steel plate.

4. The trailer of claim 2 wherein a lower support member is connected to lower ends of the vertical members below and transversely to the elongated support member wherein the lower support member extends beyond the wheels.

5. The trailer of claim 4 wherein a seat frame is connected to a top and ends of the lower support member, a steel plate is attached to the seat frame, and a seat cover is attached to seat plate.

6. The trailer of claim 2 wherein utility sections are connected to the rectangular frames between table covers.

7. The trailer of claim 6 wherein the utility sections include a plurality of cavities configured to receive a cup and a centralized pole configured to receive paper towels.

8. The trailer of claim 2 having a serving section between and transverse to table covers and above fenders that cover the wheels.

9. The trailer of claim 1 further comprising at least one transverse member connected to a pair of fenders and an axle by a pair of brackets.

10. A portable trailer, comprising;
a pair of wheels rotatably connected to an axle;
a fender covering each wheel;
a frame supported by the pair of wheels having an elongated support member that extends from a front end to a rear end of the frame;
at least one transverse support member extending outwardly and perpendicularly from the elongated support member, wherein an outer end of the at least one transverse support member is connected to the axle and the fender;
a table support having a table cover connected to the elongated member;
a brace connected to the top of and extending transversely to the elongated support member; and
a pair of vertical supports connected at the ends of the brace extending above and below the elongated support member.

11. The trailer of claim 10 further comprising the lower end of the vertical supports having a lower support member that extends transversely to the elongated support member and outwardly, beyond the pair of wheels.

12. The trailer of claim 11 further comprising a seat frame connected to the top of at least one end of the lower support members.

13. The trailer of claim 10 further comprising a rectangular frame connected to the top of the vertical supports, wherein the table cover is connected to the rectangular frame.

14. The trailer of claim 13 further comprising at least one utility section connected to and extending from the rectangular frame.

15. The trailer of claim 14 further comprising the at least one utility section having a centralized pole configured to receive paper towels.

16. The trailer of claim 10 further comprising a serving section pivotally connected to the table cover, wherein the serving section is configured to pivot outwardly over the fenders and transversely to the table cover.

* * * * *